T. F. ROWLAND.
WROUGHT IRON VESSELS FOR BUOYS, &c.
No. 178,193. Patented May 30, 1876.
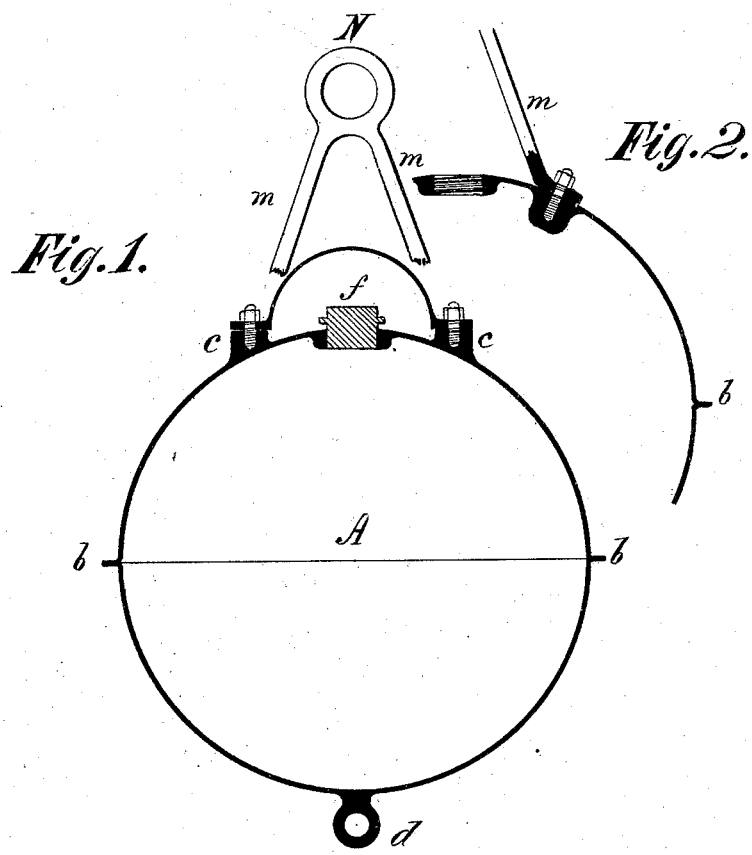

UNITED STATES PATENT OFFICE.

THOMAS F. ROWLAND, OF BROOKLYN, NEW YORK.

IMPROVEMENT IN WROUGHT-IRON VESSELS FOR BUOYS, &c.

Specification forming part of Letters Patent No. 178,193, dated May 30, 1876; application filed March 21, 1876.

*To all whom it may concern:*

Be it known that I, THOMAS F. ROWLAND, of the city of Brooklyn, in the county of Kings, in the State of New York, have invented certain new and useful improvements in the manufacture of hollow closed wrought-iron vessels formed without joint or seam, of which the following is a full, true, and exact description, reference being had to the accompanying drawings.

It is very important in forming hollow closed wrought-iron vessels which are to be exposed to the presence of corrosive substances, such as acid or sea-water, that they be made perfectly tight, and so arranged that the action of these acids shall not have the effect of causing any openings or crevices through the vessel. This is especially true in regard to those vessels which are used as buoys, and which, if the water penetrates, sink to the bottom and become useless. It is also very important in those vessels which are calculated to resist great strains, and to contain gases at high pressures.

The object of my invention is to remedy the difficulties which arise from the leaking of wrought-iron vessels, and to render them perfectly tight.

It has usually been customary to form vessels of this description of separate plates or sheets of iron, which sheets were more or less solidly attached together at their edges by means of bolts or rivets. This method of forming these vessels is liable to the difficulties I have just mentioned.

Open vessels have heretofore been frequently made in one piece, and have been struck up in dies, as is described in the patent to Wells for stamping sheet metal, January 2, 1866. I would not be understood as claiming an open vessel of this description. The purpose of my invention is to form a closed vessel. Closed vessels previously made have always been formed either by solder, or by rivets or bolts of some description, so far as I am aware, and I wish to limit my invention to welded hollow wrought-iron vessels.

I form my hollow vessels in various shapes, spherical, conical, cylindrical, &c.; but these vessels are all formed without any bolts or rivets, which method of formation is one of the important features of my invention. Another object of my invention is to provide for any attachments to the surface of these vessels which may be necessary to connect them with mooring-cables, or for other purposes. It has usually been customary to drill through the vessels used for buoys and similar purposes, and, by means of a bolt passing immediately through the vessel, to attach to it the eyebolt or mooring-ring, and such other attachments as were necessary. The result was that the sea-water, attacking the threads of these bolts, found ready access to the interior, and the usefulness of the vessel was destroyed. The second part of my invention is the remedy of this defect.

My invention consists in forming a complete hollow welded vessel of plates of rolled or wrought-iron, and welding bosses upon the surface of the same at those points upon the walls of a vessel where it has usually been customary to drill and tap into it for the purpose of making attachments thereto.

My drawings represent a hollow welded spherical vessel formed according to this plan.

Figure 1 represents a vessel having bosses welded upon its exterior surface. Fig. 2 represents a portion of a similar vessel having an interior boss for the same purpose.

$a$ represents a wrought-iron sphere, formed by two circular plates being struck up into hemispheres by means of dies of the required shape. The edges of the hemisphere are flanged outward, forming lips $b\ b$, so that when welded, one to the other, the two hemispheres form one continuous complete spherical vessel. Previous or subsequent to the welding together of the hemispheres, the bosses $c$ and $c'$, to serve as bases for the attachment N, the eyebolt $d$, the re-enforcing ring at the hand-hole $f$, and any protuberance required, are forged and welded to the walls of the vessel. These bosses may be welded as well to the interior as to the exterior of the vessel. A vessel thus formed of practically one piece of iron is perfectly tight, and can never allow the entrance or egress of any substance until the body of the iron itself is destroyed.

A vessel thus formed will be exceedingly useful as a harbor-buoy, since it can remain in position for a hundred years without any attention. The only entrance to such a vessel is by means of the hand-hole $f$, which, when once plugged up, becomes as solid and immovable as the rest of the vessel.

My vessel may be formed either with or without this hand-hole $f$. If it is desirable to obtain access to the interior of the vessel subsequent to the manufacture, I would leave such a hand-hole, $f$, in the vessel, which hole could afterward be plugged up, either by a solid plug or by means of a screw and washer, or a screw having a ground joint at its head, so arranged that there would be no access for the water to the thread of the screw. Upon this plug, of course, there would be practically no strain, and very little danger of its working loose or becoming leaky, as is now frequently the case with riveted joints.

Having thus described my invention, I claim as a new manufacture, and desire to secure by Letters Patent—

1. A welded hollow wrought-iron vessel, formed without rivet, bolt, seam, or solder, substantially as and for the purposes described.

2. A welded hollow wrought-iron vessel, formed without rivet, bolt, seam, or solder, having upon its interior or exterior surfaces welded bosses or protuberances, for the purpose of attaching thereto eyebolts or any other needed devices, substantially as and for the purposes described.

THOMAS F. ROWLAND.

Witnesses:
WARREN C. HILL,
L. A. SMITH.